Patented Apr. 7, 1953

2,634,299

UNITED STATES PATENT OFFICE 2,634,299

RECOVERY OF ERYTHRITOLS

Chester M. Himel, Palo Alto, Calif., and Lee O. Edmonds, Bartlesville, Okla., assignors to Phillips Petroleum Company, a corporation of Delaware No Drawing. Application July 12, 1949, Serial No. 104,376

2 Claims. (Cl. 260—637)

This invention relates to the production of erythritols. In one of its several aspects it relates to the recovery of erythritols from the reaction mass resulting when erythritols are formed by hydroxylation of a conjugated diolefin in the presence of a catalyst, for example, formic acid. In another of its aspects the invention relates to the crystallization of meso- and dl-erythritols from reaction masses formed by a catalytically activated hydroxylation of a diolefin with hydrogen peroxide. In still another aspect the invention relates to a process for the selective crystallization of meso- and dl-erythritols from reaction masses containing them. In still a further aspect the invention relates to a process for the recovery of meso- and dl-erythritols substantially free from contaminating impurities which are formed when a diolefin is hydroxylated with hydrogen peroxide in the presence of a catalyst, for example, formic acid. Yet, in another aspect of the invention it relates to the preparation and recovery of certain diol compounds from a reaction mass resulting when a diolefin is hydroxylated with hydrogen peroxide in the presence of a catalyst. Yet in a still further aspect of the invention it relates to the provision of a novel solvent extraction step for the removal of certain impurities or compounds present in a reaction mass from which meso- and dl-erythritols are recovered. Further aspects of the invention are evident from this specification and claims.

The invention is applicable with particularly interesting results to the recovery of meso- and dl-erythritols, as well as 3-butene-1,2-diol, from a reaction mass resulting upon the hydroxylation of butadiene by the catalytically activated action of hydrogen peroxide. Accordingly, the invention will be described as applied to said hydroxylation.

In the hydroxylation of butadiene by the catalytically activated action of hydrogen peroxide, greater or less amounts of by-products comprising 3-butene-1,2-diol, polyhydric ethers, and the like are formed. These materials tend to retard or prevent satisfactory crystallization of the products, particularly of dl-erythritol, and it is therefore preferable that they be removed prior to the crystallization step. Heretofore separation of the 3-butene-1,2-diol has been effected by distillation during the fractionation step wherein the catalyst and water are removed. However, when so operating, crystallization of the dl-isomer remains slow and the product is usually dark in color, and often reduced in yield. Such deterioration in color, difficulty in crystallization, and reduction in yield may be caused by the elevated temperatures involved in removal of the 3-butene-1,2-diol, even under reduced pressure, due to the presence of high boiling polyhydric ethers and/or residual 3-butene-1,2-diol not removed in the fractionation, or both.

We have now discovered a process for the production of meso- and dl-erythritols from the catalytically activated hydroxylation of a diolefin with hydrogen peroxide wherein the ease of crystallization, quality of the product, and yield are enhanced by a solvent extraction step integrated therein.

In Serial Number 95,386 filed May 25, 1949 by the instant inventors there is described and claimed a process for the hydroxylation of an organic compound having at least an olefinic linkage, for example butadiene, by contacting it with hydrogen peroxide in the presence of a low boiling alkyl formate. The process of the present invention is pre-eminently applicable to the reaction mass resulting from that process of hydroxylation. Thus, according to the method of the invention the effluent resulting from an hydroxylation of butadiene with hydrogen peroxide in the presence of a suitable catalyst such as a low boiling alkyl formate, is (1) subjected to fractionation to remove the catalyst and water, (2) dissolved in alcohol, (3) the solution is cooled, (4) the solution is then allowed to stand to crystallize meso-erythritol therefrom, (5) meso-erythritol is separated from the solution, (6) the alcohol removed from the solution, (7) the residue then obtained is selectively extracted to remove 3-butene-1,2-diol and high boiling polyhydric ethers, particularly those involving 3-butene-1,2-diol in their formation, (8) the raffinate is then dissolved in alcohol, (9) cooled to about 35–50° F. and (10) seeded with dl-erythritol crystals producing a product of excellent color and having a substantially constant melting point, no further purification being required.

The alcohol employed in steps (2) and (8) can be ethyl alcohol. Other equivalent solvents can also be employed.

The crystallization of meso-erythritol can be hastened by seeding to promote crystallization which, without seeding, will usually be complete in about four to ten hours.

The removal of the alcohol in step (6) is accomplished by distillation. Also the dissolution in the alcohol in steps (2) and (8) is accomplished by refluxing the mass to be dissolved with the alcohol employed. It is essential when dissolving the reaction mixture containing both isomers that the operation be effected in a closed system. Otherwise coprecipitation of the isomers may occur by adventitious seeding with a crystal of dl-erythritol. When the meso-erythritol has been removed, the foregoing precaution is no longer necessary. It is essential to seed for the crystallization of the dl-erythritol. A preformed crystal is used. Serial No. 68,738, filed December 31, 1948, by the instant inventors describes and claims a process for crystallizing both meso- and dl-erythritols from a mixture of these compounds which comprises dissolving said mixture in an alcoholic solvent, cooling the resulting solution to a temperature at which it is supersaturated with respect to the erythritols, crystallizing and then removing meso-erythritol from the solution, concentrating the remaining solution of dl-erythritol, cooling the resultant concentrated solution and crystallizing and recovering dl-erythritol therefrom. The present invention is an improvement over the invention claimed in said Serial No. 68,738 filed December 31, 1948, in that it provides a method for obtaining products of better quality and yield as well as for the recovery of certain other valuable hydroxylation reaction products.

The selective solvent found well suited to the practice of the invention, thus far, is diethyl ether. This solvent has been found to have the property of removing both the 3-butene-1,2-diol and the high boiling polyhydric ethers simultaneously. Also, the recovery of 3-butene-1,2-diol, a desirable product, is readily effected upon treating the extract phase in a usually adopted manner to separate its constituents. The solvents employed in the extraction step of our process include diethyl, di-isopropyl and dibutyl ethers; chlorinated hydrocarbons boiling below 300° F., such as chloroform, carbon tetrachloride, dichloromethane, and the like; furan, tetrahydrofuran, and similar materials. The principal criteria for the solvent used are that it be a material in which 3-butene-1,2-diol and polyhydric ethers derived therefrom are soluble and in which the isomeric meso- and dl-erythritols are insoluble, that it should boil below about 300° F., and that it be chemically stable and inert with respect to the products present.

It is an advantage of our process that meso- and dl-erythritols can be produced in high yield from the corresponding diolefin. A further advantage lies in the excellent color characteristics and high degree of purity of the product, particularly of the dl-erythritol obtained. A still further advantage lies in the recovery of 3-butene-1,2-diol as a valuable by-product of the process.

The solvent extraction step of the invention may involve agitation of the catalyst-free crude hydroxylation effluent with the solvent followed by settling and separation of the extract phase or it may be effected as a counter-current operation. While it is now preferred to effect the solvent extraction step following the crystallization of the meso-erythritol and prior to crystallization of the dl-isomer, it is within the scope of the invention to practice this step before either iosmer is removed from the hydroxylation effluent.

The quantity of solvent employed during the extraction step should be from about one to about ten volumes per volume of crude reaction mixture extracted. The temperature during the extraction will be, ordinarily, in the range from about 50° F. to about 90° F., although higher or lower temperatures can be used. The solvent extraction has been suitably accomplished at room temperature.

Example

Two runs were made in which the reactors were charged with 180 grams of methyl formate, 561 grams of 29 per cent aqueous hydrogen peroxide diluted with 1056 grams of water, and 120.5 grams of butadiene. These mixtures were agitated at 122° F. for 48 hours, cooled to 77° F., and opened. The reaction mixtures were separately subjected to flash distillation to recover the catalyst. With the first reaction mixture (run A) the distillation was continued under reduced pressure to remove water and butene diol, after which the kettle product was dissolved in an equal weight of ethyl alcohol by refluxing in a closed system. The solution so obtained was cooled to 41° F. and seeded with a crystal of meso-erythritol. After about six hours the crystalline meso-isomer was removed by filtration. The filtrate was then reduced to half its volume by distillation and again cooled to 41° F., after which it was seeded with a crystal of dl-erythritol. Crystallization was substantially complete after about 96 hours.

The reaction mixture from the second reactor (run B) was stripped with steam to remove water, after which it was dissolved in an equal weight of alcohol by refluxing therewith in a closed system and cooled to 41° F. Crystallization of meso-erythritol was initiated by seeding as before and was regarded as complete after about six hours. The crystalline meso-isomer was removed on a filter after which the alcohol solvent was distilled. The kettle residue, comprising 3-butene-1,2-diol, high boiling polyhydric ethers, and dl-erythritol was then extracted in a continuous liquid-liquid extractor, using 1200 ml. of diethyl ether as the solvent. The raffinate was then redissolved in an equal volume of ethyl alcohol by refluxing in a closed system as before. The solution was cooled to 41° F. and seeded with a crystal of dl-erythritol. After about 16 hours, crystallization of the dl-isomer was substantially complete. The extract was fractionated to recover the solvent and separate 3-butene-1,2-diol as a pure product.

Data on these runs are summarized in the following tabulation:

| Run | C$_4$H$_6$ Conv. (gm.) | Butadiene Polymer (gm.) | Yield (gm.), m-erythritol | Yield (gm.), dl-erythritol | Color, dl-erythritol | M. P., ° F., dl-erythritol | Yield (gm.), Diol | Total Yield, Percent |
|---|---|---|---|---|---|---|---|---|
| A | 118.5 | 3.0 | 71 | 59 | Brown | 131–149 | 28 | 65.3 |
| B | 118.5 | 3.0 | 72 | 69 | White | 147–151 | 25 | 68 |

From the foregoing example it is evident that operation according to the present invention yielded more product, of a higher quality in respect of color, and higher purity in respect of melting point than did operation according to the method wherein the butene diol is recovered by distillation.

Reasonable variation and modification are possible within the scope of the above disclosure and the appended claims to the invention the essence of which is that a considerably improved product and yield of erythritols can be obtained by performing a solvent extraction step, in lieu of a distillation step, to remove by-product materials.

We claim:

1. In the preparation of crystalline meso- and dl-erythritols from a catalyst-free effluent of an hydroxylation of butadiene in the presence of a catalyst the step comprising dissolving said effluent in an alcohol in a closed system, crystallizing and separating meso-erythritol therefrom, removing said alcohol, selectively extracting 3-butene-1,2-diol from the remaining solution with diethyl ether and then crystallizing and removing the dl-erythritol therefrom.

2. In the preparation of crystalline meso- and dl-erythritols from a catalyst-free effluent of an hydroxylation of butadiene with hydrogen peroxide in the presence of a catalyst the improvement which comprises the steps in combination of; (a) dissolving said effluent ethyl in alcohol in a closed system, (b) cooling said effluent in the range of 35 to 50° F. so as to crystallize meso-erythritol, (c) separating said crystals from said alcohol solution, (d) removing said alcohol from said solution by distillation, (e) contacting a resulting residue from said distillation with one to ten volumes of diethyl ether so as to extract impurities comprising 3-butene-1,2-diol, (f) redissolving a resulting raffinate in alcohol, and (g) cooling a resulting solution in the range of 35 to 50° F. so as to crystallize dl-erythritol.

CHESTER M. HIMEL.
LEE O. EDMONDS.

REFERENCES CITED

The following references are of record in the file of this patent:

UNITED STATES PATENTS

| Number | Name | Date |
| --- | --- | --- |
| 2,069,064 | Gore | Jan. 26, 1937 |
| 2,233,606 | Hass | Mar. 4, 1941 |
| 2,270,839 | Wyler | Jan. 20, 1942 |
| 2,382,288 | Braun et al. | Aug. 14, 1945 |
| 2,437,277 | Soday | Mar. 9, 1948 |
| 2,456,752 | Surmatic | Dec. 21, 1948 |
| 2,492,201 | Swern et al. | Dec. 27, 1949 |